April 29, 1947.    W. F. WEGST ET AL    2,419,805

INHIBITING ALKALI DISSOLUTION OF GLASS

Filed May 6, 1943

INVENTORS
WALTER F. WEGST,
LESLIE R. BACON and
BY  THOMAS H. VAUGHN

*Oberlin, Limbach & Day*
ATTORNEYS

UNITED STATES PATENT OFFICE 2,419,805

INHIBITING ALKALI DISSOLUTION OF GLASS

Walter F. Wegst and Leslie R. Bacon, Wyandotte, and Thomas H. Vaughn, Grosse Ile, Mich., assignors to Wyandotte Chemicals Corporation, Wyandotte, Mich., a corporation of Michigan Application May 6, 1943, Serial No. 485,882

7 Claims. (Cl. 252—156)

The present invention relates to a method and product for preventing the glass-dissolving action of alkali solutions. Our invention is particularly applicable to alkali detergent compositions used in the washing of glass containers or those having glass or vitreous ceramic exposed surfaces.

While our invention is herein described with particular reference to the cleansing of glass bottles, such as milk and beverage bottles, such invention is similarly available in general in the cleansing by alkaline detergents of glazed or vitreous ceramic surfaces, such as those of mixing kettles, holding vessels, pasteurizers, etc., widely used in the food industries, where the efficient germicidal and strong cleansing action of alkali would be desirable but for its corrosive action.

It is the common practice in the bottling of dairy products and a variety of beverages to refill and re-use the glass bottles many times over, during their normal life. When such bottles are returned to the bottler after being emptied by the consumer, it is highly important that they be subjected to a vigorous and thorough washing, not only to remove residues, dirt and soil and similar contamination and thus to render them physically clean, but also to subject them to a germicidal action in order to render them sterile and free from bacterial or fungal contamination. Washing solutions of relatively high alkaline strength have been found most suitable in practice for a washing operation of this nature. Caustic alkali, e. g., sodium hydroxide, is the major ingredient of most such alkali washing solutions. In fact, several state laws require a minimum NaOH content in the bottle washing solutions employed by bottling plant operators.

Other ingredients commonly employed in limited proportions in addition to caustic soda are the carbonates, orthophosphates and silicates of soda. To a more limited extent commercially, pyrophosphates, polyphosphates and borates of soda, and surface active agents, may be similarly employed. Small proportions of neutral salts, of which sodium chloride or sodium sulfate are representative examples, are not uncommonly introduced, either accidentally as impurities or to attain desired objectives. Any impurities of the water supply will of course be present, either in original form or as modified by reaction with constituents of the alkaline solutions, and further in some cases, reagents added separately for softening or special conditioning of the water supply.

It has been found, however, that such alkali washing solutions, e. g., a solution having 1 to 10% by weight NaOH content, have a serious and objectionable glass dissolving action which is particularly emphasized under conditions of commercial bottle washing operations where the alkali solution is heated and the glass bottles handled in a mechanical washing machine. This glass dissolving action assists mechanical action; i. e., physical contact and abrasion of the bottles in the washing machine, and results in a deterioration of the surface appearance of the glass, producing scuffed, etched or worn effects thereon; dulls the brightness and original clear, brilliant appearance of the glass; deteriorates glass frit color labels fused onto the surface of the bottles; and results in a weakening of the strength of glass bottles, rendering them more liable to breakage and explosion after filling and crowning, particularly in the case of pressure retaining vessels, such as carbonated beverage bottles.

Realizing that the above mentioned difficulties could not be overcome by the obvious expedient of eliminating the presence of caustic alkali in the washing solution, since the efficiency of the detergent and germicidal action of the latter would also be greatly diminished, we have set out in making the present invention, to discover a chemical ingredient which could be used with the alkali washing solution and would not impair its detergent or germicidal activity, while at the same time inhibiting or preventing the glass dissolution property of the alkali.

We have made the unexpected discovery that compounds of beryllium, added to the alkali solution in relatively small amounts, e. g., from .05% up to 2½% BeO content by weight or its equivalent upon the basis of anhydrous alkali present, have the remarkable result of practically entirely eliminating the glass dissolving action of caustic alkalis. It has been found that in some instances bottle washing alkali solutions made according to the teachings of our invention have a lesser tendency to dissolve glass than pure or distilled water itself.

Our invention also comprises a new chemical composition consisting of a berylliated caustic alkali compound, and the method for making it, such composition being admirably suited to the manufacture of glass washing alkali solutions possessing the glass dissolution inhibiting properties of our invention.

To the accomplishment of the foregoing and related ends, said invention then consists of the method and means hereinafter fully described and particularly pointed out in the claims.

The annexed drawing and the following description set forth in detail a number of methods and products exemplifying our invention, such disclosed procedures and products constituting, however, but a few examples of various applications of the principle of our invention.

In said annexed drawing—

Figure 1:
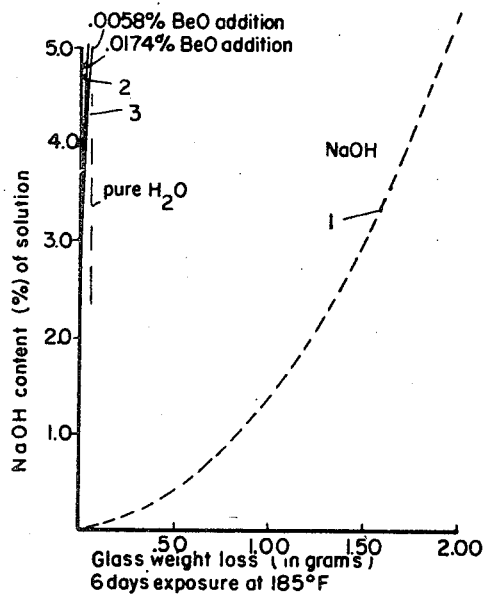
Fig. 1 is a chart illustrating the glass dissolution inhibiting properties of alkali solutions embodying the principle of our invention, and containing curves representing the amount of glass dissolving action (or "glass weight loss") for various concentrations of alkali solution.

When glass bottles or beverage containers are returned to the bottling plant for washing prior to re-filling, they are ordinarily passed through either soaker type or hydraulic type washing machines. In a large machine of the soaker type a typical cycle of operations would consist in the following:

Prerinse with warm water.
Soak at 140° F. in alkaline solution of 3.0–3.5% caustic soda content.
Soak at 155° F. in alkaline solution of 2.5–3.0% caustic soda content.
Water rinse at lower temperature, as 125° F.
Water rinse at lower temperatures, as 95° F.
Internal and external brushing.
One or more internal and external cool water rinses.
Internal chlorination rinse.

In practice the number and sequence of cleansing steps is subject to considerable variation, however, and this is true also of temperatures and concentrations of solutions employed. The step of chlorination is most commonly employed in the washing of dairy bottles.

The practicable ranges of temperature and concentration for the alkaline solutions are usually taken to be 120–165° F. and 1–5%[1] caustic, as hereinafter defined; although as high as 10% caustic may be employed under certain rigorous washing and cleaning conditions. The effects of soaking time, alkaline concentration and temperature are interrelated in the sense that increased temperatures and/or concentrations diminish the soaking period required to attain a given standard of cleansing and germicidal performance. It is known further that increases in temperature of the alkaline solutions are reflected in increased deterioration of the glass surfaces and it is generally true that within the practicable economic limits increased concentrations are reflected in increased corrosion and dissolution of the glass. The period of exposure of bottles to the detergent solutions will usually run upward of 5 minutes per complete cleansing cycle in soaker type machines.

Hydraulic type machines operate on the principle of projecting streams of alkaline solution and rinse waters at high velocity upon the bottles internally and externally rather than passage of bottles through soaker tanks. Due to the vigorous mechanical action the practicable concentrations of and exposures to strongly alkaline solutions may run somewhat lower than for soaker type machines.

In either type machines, the alkali content of the washing solutions is maintained by suitable additions (make-up) from time to time. Control in the field may be exercised through indicating meters or by simplified chemical test methods. One common basis for controlling alkali concentration is the determination of actual caustic soda content, the ordinary practicable ranges of which may be taken to be 1–5%, dependent on other conditions hereinbefore referred to.

It has been determined that the alkali attack upon glass bottles during such a washing treatment is in the nature of a dissolution of the glass by the alkali; hence a determination of the weight loss of glass bottles subjected to the action of an alkali washing solution presents a reliable criterion for measuring the degree of such attack.

A quite vigorous and reliable test for such a glass dissolving action of alkali washing solutions upon bottles consists in filling and sealing the test bottles with the solution to be tested, subjecting such bottles to a temperature of 185° F. for a period of six days, emptying the solution from the bottles and then measuring the loss in weight of the bottles.

Figure 3:
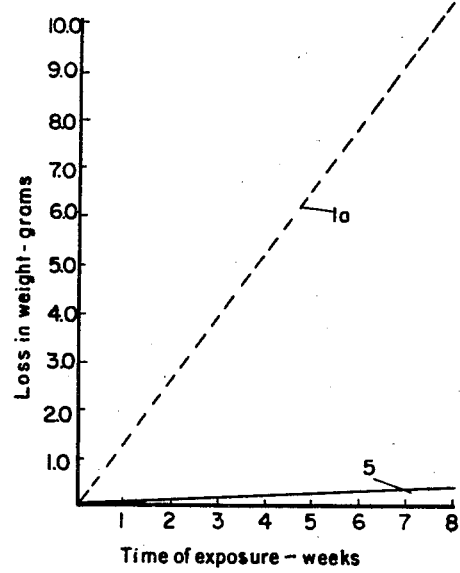
Fig. 3 is a diagram illustrating the glass dissolution inhibiting action of our invention over relatively long periods of time.

We have determined that when a caustic soda solution is so tested, that the loss in weight, viz., the glass dissolving action, progressively increases with concentration and time of exposure. Thus the dotted line curve I in Fig. 1 represents the glass dissolving effect of an NaOH solution having up to 5% NaOH content; and the dotted line Ia in Fig. 3 shows the glass dissolving action of a 3% NaOH solution over a period of exposure of eight weeks. The glass bottles subjected to these tests were new glass beverage bottles of approximately 6 fluid oz. capacity and weighing approximately 393±3 grams.

We have discovered that such glass dissolving properties of caustic alkali solutions can be inhibited, if not eliminated, for all practical intents and purposes, by the addition of a relatively small amount of beryllium compound, either in the form of a soluble beryllium salt, such as beryllium sulfate ($BeSO_4.4H_2O$) to the alkali washing solution, or by the initial composition of a berylliated caustic soda which is subsequently employed in and of itself as the detergent material made up into the washing solution, or incorporated with other alkaline detergent materials going to make up the final washing solution.

The following is an example of how our invention may be performed:

EXAMPLE 1

8.92 gms. of $BeSO_4.4H_2O$ and 15 gms. of NaOH (anhydrous) were dissolved in separate portions of distilled water, the total amount of water being 500 ml. The beryllium sulfate solution was slowly poured into the NaOH solution at room temperature, and with vigorous stirring. A white precipitate initially formed, but rapidly dissolved after formation. 200 ml. of this solution was placed in a previously weighed new beverage bottle, of the type previously mentioned, the latter sealed, and a temperature of 185° F. maintained for six days. The calculated analysis of ---
[1] All percentage proportion values given throughout herein are by weight.

the above-tested solution was approximately as follows:

NaOH, 2.2% by weight.
Na₂SO₄, 1.4% by weight.
BeO, 0.25% by weight; or 11.4% on free NaOH basis.

The weight measurements of the glass bottle at the beginning and end of the test, with resultant weight loss, were as follows:

*Bottle weights*

[In grams]

| Initial | Final | Loss |
|---|---|---|
| 395.966 | 395.917 | 0.049 |

Referring to Fig. 1, it will be seen that the normal weight loss of a similar glass bottle subjected to an NaOH solution of 2.2% NaOH content would be approximately 1.4 gms., which represents $$\frac{1.400}{.049} \text{ or } 28.5$$

times the weight loss of a solution of the same NaOH content with .25% BeO addition.

Several alkali solutions were made up in which the BeO and NaOH contents were varied.

The following table shows the results of the weight loss tests performed with these solutions in the same manner as described in Example 1. The total caustic soda and BeSO₄.4H₂O used for making up each one of these solutions is set forth in the first two colums of the table. Since the caustic soda and beryllium sulfate react in accordance with the following equation $$BeSO_4.4H_2O + 2NaOH \rightarrow BE(OH)_2 + Na_2SO_4 + 4H_2O$$

the initial NaOH content was correspondingly reduced, so it was necessary to calculate the final amount of free caustic in solution, as found in the fourth column. Column 5 then shows the percentage relationship of BeO content on the basis of free NaOH present in the resultant solution.

will thus be seen that in the majority of instances, the glass weight loss or glass dissolving action of the alkali solution was, by virtue of the beryllium compound addition, actually reduced to less than that which could be caused by contact with pure water alone, under similar conditions of exposure and temperature.

The solid line curves 2 and 3 of Fig. 1 represent the glass weight loss or glass dissolving effect of various alkali solutions having .0174% and .0058% BeO additions, respectively. Comparison of curves 2 and 3, with curve 1, will show not only that they are of opposite characteristics, but also will illustrate the remarkable inhibiting action of the composition embodying our invention, since it is on the order of that of distilled water itself.

Figure 2:
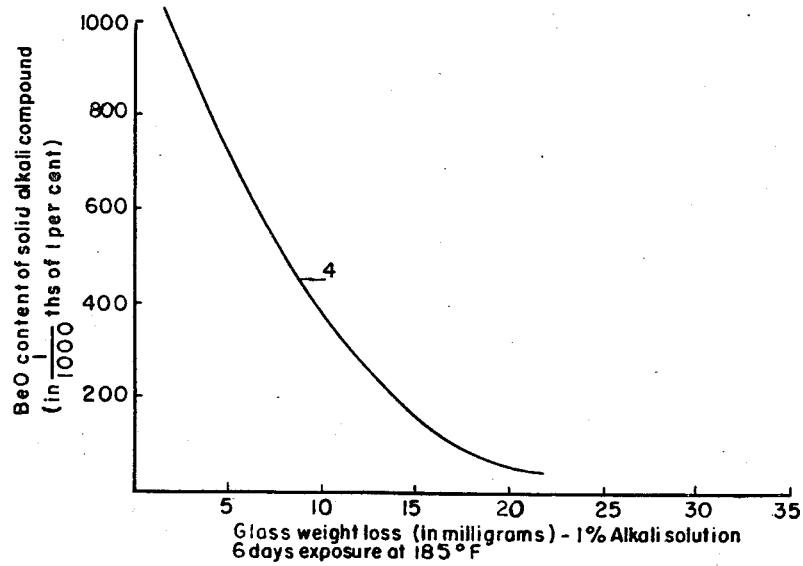
Fig. 2 is a diagram showing a curve illustrating the relationship between the BeO content of the alkali solution, and the glass dissolving action.

In Fig. 2 the variation in BeO content as compared to glass weight loss, and taken from the values given in the foregoing table, is represented by curve 4. It will thus be seen, with .05% or more BeO content by weight, on the solids basis of free caustic soda present, that the glass dissolving action of the alkali solution is, for all practical intents and purposes, eliminated. Increasing the percentage of BeO, as shown by the characteristics of curve 4, results in a rapid rate of decrease in the glass dissolving action. It has been determined that the economically practical upper limit for BeO content is 2½%, which is capable of producing the desired inhibition of glass dissolving action in caustic alkali solutions encountered in most commercial bottle washing operations. Higher percentage content of BeO (on NaOH basis) may be of course employed, such as the 11.4% of Example I, but the increased BeO content would not seem to be economically justified for the relative amount of inhibition of glass dissolving action, except in unusual cases.

The addition of beryllium to the alkali washing solution may also be accomplished through the medium of fusing a naturally occurring beryllium compound with caustic alkali. Such naturally occurring beryllium compounds are to be found among the beryllium-containing minerals such as beryl (3BeO.Al₂O₃.6SiO₂) and phenacite (2BeO.SiO₂). Even though such be-

TABLE I

| 1 | 2 | 3 | 4 | 5 | 6 |
|---|---|---|---|---|---|
| Total NaOH used for 200 ml. final solution | BeSO₄.4H₂O used for 200 ml. final solution | Approx. % BeO in solution | Approx. % free caustic in solution | % BeO on free NaOH basis | Weight loss of bottle |
| *Grams* | *Grams* | | | | *Grams* |
| 2.0000 | 0 | 0 | 1.00 | ......... | 0.869 |
| 1.9974 | 0.0082 | 0.00058 | 1.00 | .058 | .022 |
| 1.9949 | .0164 | .00116 | .99 | .117 | .016 |
| 1.9845 | .0493 | .00348 | .98 | .355 | .011 |
| 1.9743 | .0821 | .0058 | .97 | .598 | .009 |
| 1.9485 | .1642 | .0116 | .94 | 1.234 | .002 |
| 1.897 | .3284 | .0232 | .87 | 2.667 | .011 |
| 6.0000 | 0 | 0 | 3.00 | ......... | 1.425 |
| 5.9923 | 0.0246 | 0.00174 | 2.99 | .058 | .049 |
| 5.9845 | .0492 | .00348 | 2.98 | .117 | .038 |
| 5.9534 | .1476 | .0104 | 2.94 | .354 | .030 |
| 5.923 | .246 | .0174 | 2.91 | .598 | .024 |
| 10.0000 | 0 | 0 | 5.00 | ......... | 1.887 |
| 9.9871 | 0.0411 | 0.0029 | 4.98 | .058 | .509 |
| 9.9743 | .0821 | .0058 | 4.97 | .117 | .059 |
| 9.923 | .2463 | .0174 | 4.91 | .354 | .043 |
| 9.871 | .4105 | .0290 | 4.84 | .599 | .063 |
| 9.743 | .821 | .058 | 4.69 | 1.237 | .023 |
| 9.485 | 1.642 | .116 | 4.87 | 2.654 | .027 |

The same tests conducted upon similar bottles, but with distilled water alone as the filling medium, showed an average weight loss of 0.057 gms. From the result of the foregoing table, it ryllium-containing minerals are infusible in and of themselves, we have discovered that they are fusible with anhydrous caustic soda to produce a compound which is soluble in water.

The following example sets forth in detail one mode of accomplishing this feature of our invention:

EXAMPLE 2

12 gms. of the mineral beryl, containing a minimum 10% BeO content, were ground and crushed to a ⅛ inch particle size. 400 gms. of anhydrous NaOH were melted in a nickel dish, the 12 gms. of ground beryl added and the mixture fused for 1½ hrs. at 560° C. The melt was then decanted through flaking rolls, resulting in a white flake product which was readily soluble in distilled water, forming a clear solution.

The beryl-NaOH fusion product thus contained approximately .3% by weight BeO and 97% by weight NaOH. This product was then dissolved in distilled water at concentrations of one, three and five per cent by weight of solids and subjected to the glass weight loss test as previously hereinabove described, four test bottles being used for each respective concentration. Since the solid product contained approximately 97% NaOH, the resultant NaOH content of the water solutions tested would thus be approximately one, three and five per cent, respectively.

The results of the glass weight loss tests upon these solutions were as follows:

TABLE II
*Weight loss*

| Solution Strength | 0.3% BeO Content Beryl-NaOH Fusion Product | NaOH Alone |
|---|---|---|
| | Grams | Grams |
| 1% | 0.016 | |
| | 0.013 | |
| | 0.010 | |
| | 0.010 | |
| Average | 0.0122 | .853 |
| 3% | 0.024 | |
| | 0.014 | |
| | 0.012 | |
| | 0.009 | |
| Average | 0.0147 | 1.470 |
| 5% | 0.031 | |
| | 0.039 | |
| | 0.015 | |
| | 0.021 | |
| Average | 0.0265 | 1.748 |

The fused beryl-NaOH compound was also tested over an extended period of time. The same size of glass beverage bottles, viz., having a weight of 393±3 gms., were filled and sealed with the test solution and maintained at a temperature of 185° F. for a period of 8 weeks, and the weight loss over weekly periods was determined. A 3% water solution of the product made according to Example 2 above was used in this test and the results thereof are shown by line 5 in Fig. 3. Comparing line 5 with the dotted line $1a$ which represents the glass dissolving effect of a 3% NaOH solution, the remarkable glass dissolution inhibiting action of the new composition embodying the principle of our invention becomes immediately apparent.

The beryllium mineral-caustic soda fusion compound can be used either to make up a bottle washing solution alone and directly, or it may be added to a previously prepared alkaline solution. In either event, the beneficial protection of the glass dissolution inhibiting compound results. If the fusion compound is added to a previously prepared alkaline washing solution, adjustment should, of course, be made for the increase in the actual NaOH content of the original solution which is derived from the NaOH content of the added fusion compound. The addition of the fusion compound to a previously prepared alkaline solution should be in such an amount that the actual NaOH content of the resultant solution is in the 1–10% range.

In the formulation of commercial detergent compositions, according to the teachings of our invention, other alkaline detergent materials may, of course, be present. Such alkaline detergent materials are the alkali metal phosphates, carbonates, borates and silicates, such as trisodium phosphate, sodium tetraphosphate, sodium carbonate, borax and sodium metasilicate. These alkaline ingredients may be present in the amount of 1–40% by weight, together with caustic soda and the beryllium compound. The criterion of our invention is that, regardless of the particular alkaline compound present other than caustic soda, the actual NaOH content of the resultant washing solution shall be 1–10% and that the beryllium content shall be .05% to 11.4% BeO or equivalent by weight on the basis of the total, actual NaOH content of the resultant solution.

In the case of the utilization of $BeSO_4.4H_2O$ as the beryllium-containing medium, this range of .05% to 11.4% BeO content is accordingly calculated to be .35–80% by weight on the basis of total, actual NaOH content of the solution.

Other modes of applying the principle of our invention may be employed instead of the one explained, change being made as regards the product and method herein disclosed, provided the step or steps stated by any of the following claims or the equivalent of such stated step or steps be employed.

We therefore particularly point out and distinctly claim as our invention:

1. The method of inhibiting the glass-dissolving action of aqueous alkali solutions in which caustic alkali is the principal solute present in the amount of 1 to 10% by weight, comprising the addition thereto of a water soluble beryllium compound in the amount of .05% to 11.4% in terms of BeO equivalent weight on the basis of NaOH content.

2. A washing solution deterring the glass-dissolving action of strong alkaline solution comprising an aqueous solution of 1% to 10% by weight NaOH content containing dissolved therein in the amount of approximately .35% to 80% by weight of $BeSO_4.4H_2O$ on the basis of the actual NaOH content of the alkaline compounds present in such solution.

3. A washing solution inhibiting glass-dissolving action of alkalies comprising an aqueous solution of a caustic alkali and an alkaline salt having about a 1% to 10% by weight actual NaOH content, and a soluble beryllium compound dissolved therein in the amount of approximately .05% to 11.4% in terms of BeO by weight on the basis of the total, actual NaOH content in such solution.

4. The method of washing glass bottles and the like which comprises the steps of contacting said bottles with a heated solution of which caustic alkali is the principal solute, such solution having an actual NaOH content of 1% to 10% by weight, and containing a beryllium compound dissolved in said solution, the amount of said beryllium compound being approximately .05% to 11.4% in terms of BeO equivalent by weight on the basis of the total actual NaOH content of said solution.

5. The method of washing glass bottles and the like which comprises the step of contacting said bottles with a heated solution of which caustic soda is the principal solute, such solution having an actual NaOH content of 1% to 10% by weight, and containing $BeSO_4.4H_2O$ being approximately .35% to 80% by weight on the basis of the actual NaOH content of said solution.

6. A solid detergent for cleansing glass and vitreous ceramic surfaces comprising a major proportion of caustic soda and a water-soluble beryllium compound present in an amount sufficient to give a BeO content of .05% to 11.4% by weight on the basis of caustic soda content.

7. A detergent material for cleansing glass and vitreous ceramic surfaces comprising .35% to 80% by weight $BeSO_4.4H_2O$ and the balance caustic soda.

WALTER F. WEGST.
LESLIE R. BACON.
THOMAS H. VAUGHN.

REFERENCES CITED

The following references are of record in the file of this patent:

UNITED STATES PATENTS

| Number | Name | Date |
|---|---|---|
| 2,238,206 | Adamoli | Apr. 15, 1941 |
| 2,284,743 | Kawecki et al. | June 2, 1942 |
| 2,241,984 | Cooper | May 13, 1941 |

FOREIGN PATENTS

| Number | Country | Date |
|---|---|---|
| 435,092 | British | Sept. 13, 1935 |

OTHER REFERENCES

Production of Beryllium Oxide From Beryl, Winter. Dissertation pub. in N. Y., 1939, pages 18–19.

Production of Beryllium Oxide From Beryl, Winter, page 24.